United States Patent [19]

Owen

[11] Patent Number: 4,905,210
[45] Date of Patent: Feb. 27, 1990

[54] LIQUID IMPOUNDMENT SURVEY VEHICLE INCORPORATING POSITIONING FINDING AND TRACKING SYSTEM

[75] Inventor: Thomas E. Owen, Helotes, Tex.

[73] Assignee: Southwest Research Institute, San Antonio, Tex.

[21] Appl. No.: 27,848

[22] Filed: Mar. 19, 1987

[51] Int. Cl.⁴ .............................................. G01S 15/74
[52] U.S. Cl. .................................... 367/128; 367/117; 340/605; 324/546
[58] Field of Search ............... 367/118, 907, 128, 129, 367/127, 117, 902; 73/592, 40.5 A, 49.2, 49.3; 340/988, 850, 991, 851, 605, 852; 324/557, 559, 546

[56] References Cited

U.S. PATENT DOCUMENTS

| | | | |
|---|---|---|---|
| 2,261,252 | 11/1941 | Hawk | 340/992 |
| 2,910,665 | 10/1959 | Hawkins | 367/128 |
| 3,421,138 | 1/1969 | Moulin et al. | 367/128 |
| 3,526,831 | 9/1970 | Smith . | |
| 3,800,217 | 3/1974 | Lowrance . | |
| 4,055,830 | 10/1977 | Wilson et al. | 367/128 |
| 4,078,510 | 3/1978 | Morgan | 114/144 A |
| 4,101,827 | 7/1978 | Offner . | |
| 4,110,726 | 8/1978 | Dorrance et al. | 367/128 |
| 4,543,525 | 9/1985 | Boryta et al. . | |
| 4,719,407 | 1/1988 | Converse et al. | 324/546 |
| 4,725,785 | 2/1988 | Converse et al. | 340/605 |

*Primary Examiner*—Thomas H. Tarcza
*Assistant Examiner*—Tod Swann
*Attorney, Agent, or Firm*—Gunn, Lee & Miller

[57] ABSTRACT

In a geomembrane defined impoundment, a leak is located by vessel supported means. The present invention is directed to locating the vessel so as to then locate the leak. A set of N hydrophones spaced around the impoundment detect a liquid transmitted acoustic pulse from the vessel. The vessel supports an RF transmitter which broadcasts a timing pulse. With the timing pulse, elapsed acoustic travel time is measured to define range in the liquid. The range defines an arc of a circle around a single hydrophone. Using N hydrophones, N arcs are defined on the impoundment, each centered on the respective hydrophones, to intersect at the vessel location.

13 Claims, 2 Drawing Sheets

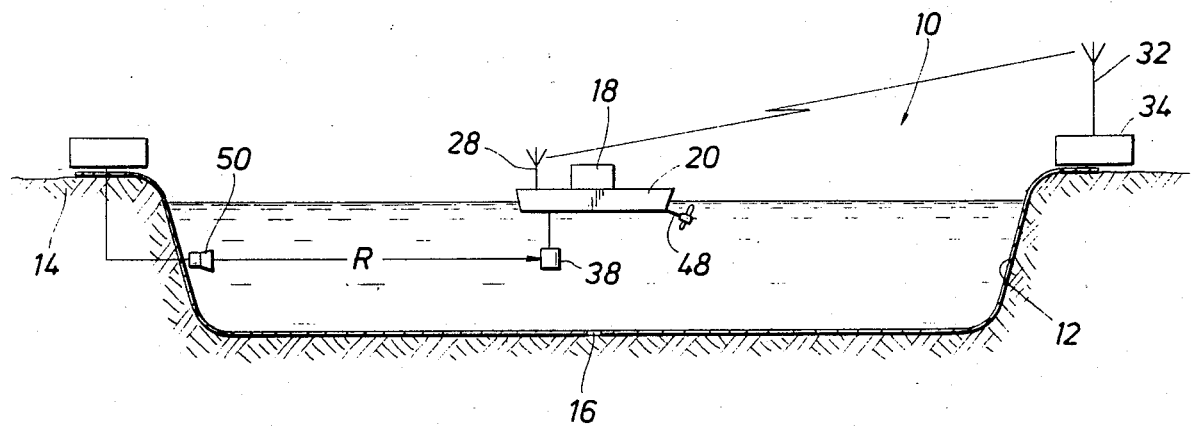
FIG.1
FIG.2
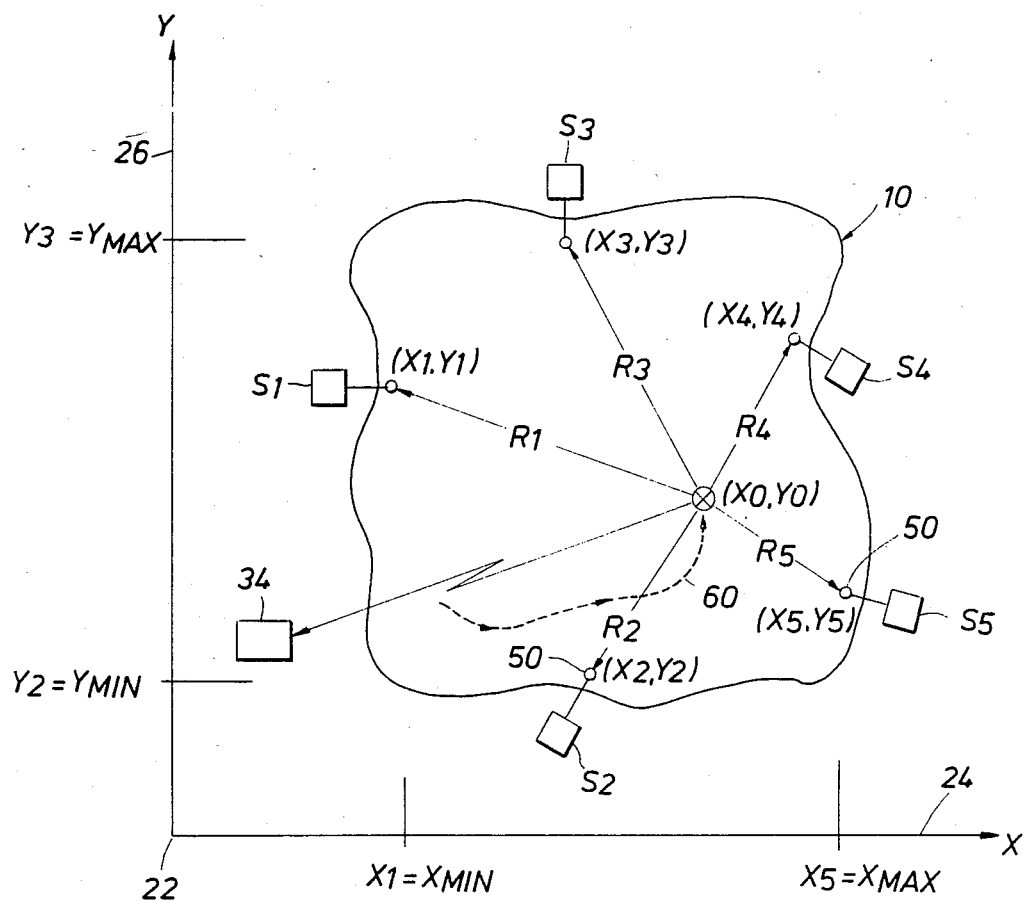

LIQUID IMPOUNDMENT SURVEY VEHICLE INCORPORATING POSITIONING FINDING AND TRACKING SYSTEM

FIELD OF THE INVENTION

The present disclosure is directed to position finding and tracking apparatus to be used within a geomembrane defined liquid impoundment. Such impoundments are subject to leakage. In view of the fact that such an impoundment may cover several hundred acres, monitoring equipment is placed on a small boat to travel over the surface of the impoundment to detect and locate leaks. Location of a leak is dependent on accurate location of the position of the impoundment inspecting boat, and the present disclosure sets forth a system including position finding and tracking apparatus to thereby locate the boat and any detected leaks.

BACKGROUND OF THE INVENTION

A geomembrane is a thin sheet of pliable plastic material which is placed in a shallow pond typically formed with earth moving equipment. The pond may be very expansive, typically covering a few acres up to several hundred acres. Typically, it is relatively shallow. It is lined with one or more layers of a geomembrane to prevent leakage of the impounded liquid. Occasionally, leaks do occur. The pond must be inspected to test for leaks, test equipment is typically placed on a small boat or other vessel which traverses the pond. The leak can be detected, but the location of the leak in turn is dependent upon precise location of the boat or vessel. The present apparatus is a position location and tracking system which aids in this specific determination.

The small boat or vessel which traverses the pond is typically an unmanned boat or vessel. It is equipped with some type of propulsion system. It must be located to assist in finding a leak or tear in the geomembrane liner detected by equipment carried on the boat or vessel (such equipment is described elsewhere). Thus, this makes vessel location an important factor in determining the location of the leak so repairs and testing can be undertaken thereafter.

In general terms, the apparatus of this disclosure is directed to a boat supported system which includes a radio frequency transmitter. It transmits a timing pulse periodically. In addition, it supports an acoustic transmitter which forms an acoustic pulse transmitted through the impounded liquid. Both transmitters radiate omnidirectionally. This enables the two radiated signals to impinge on radio frequency and acoustic receiver apparatus at various locations around the edges of the impoundment. The locations of the shore located listening stations are known in advance and by means of the apparatus described hereinbelow, the precise position of the vessel can then be resolved with a high degree of accuracy. As will be understood, in a typical installation, only one radio frequency receiver station and three acoustic receiver stations are required. Redundancy is obtained by using more acoustic receivers, and the measure of accuracy can be thereby increased. In the unlikely event of momentary equipment failure at one or more of the acoustic receiver stations, extra receiver stations prevent data loss.

BRIEF SUMMARY OF THE DISCLOSED INVENTION

The present disclosure is directed to a system for inspecting a geomembrane defined liquid impoundment for leaks. This contemplates the use of a small boat or vessel which travels over the surface of the impoundment. In the event that a leak occurs, the vessel detects the leak by means described elsewhere, and the present invention is used to provide an indication of the location of the small boat or vessel so that the location of the leak can then be determined. This apparatus utilizes a radio frequency transmitter on the boat that transmits a timing pulse which starts a sequence of measuring events as will be described. Additionally, the vessel carries a transmitter which forms a pulse transmitted from an acoustic transducer through the liquid of the impoundment. This travels to several acoustic receiver stations. Each station is typically formed of a hydrophone placed in the liquid and the appropriate electronic equipment as will be described. The system determines the location of the vessel.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 shows a geomembrane defined impoundment having a leak therein detected by traversing the impoundment with a small vessel, and the vessel supports transmitter equipment for use with the position finding and tracking system of the present disclosure;

FIG. 2 is a plan view of the impoundment shown in FIG. 1 locating several listening stations around the periphery of the impoundment and further depicting a superimposed coordinate system for definition of the location of the vessel in accordance with this disclosure.

DETAILED DESCRIPTION OF THE PREFERRED EMBODIMENT

Figure 3:
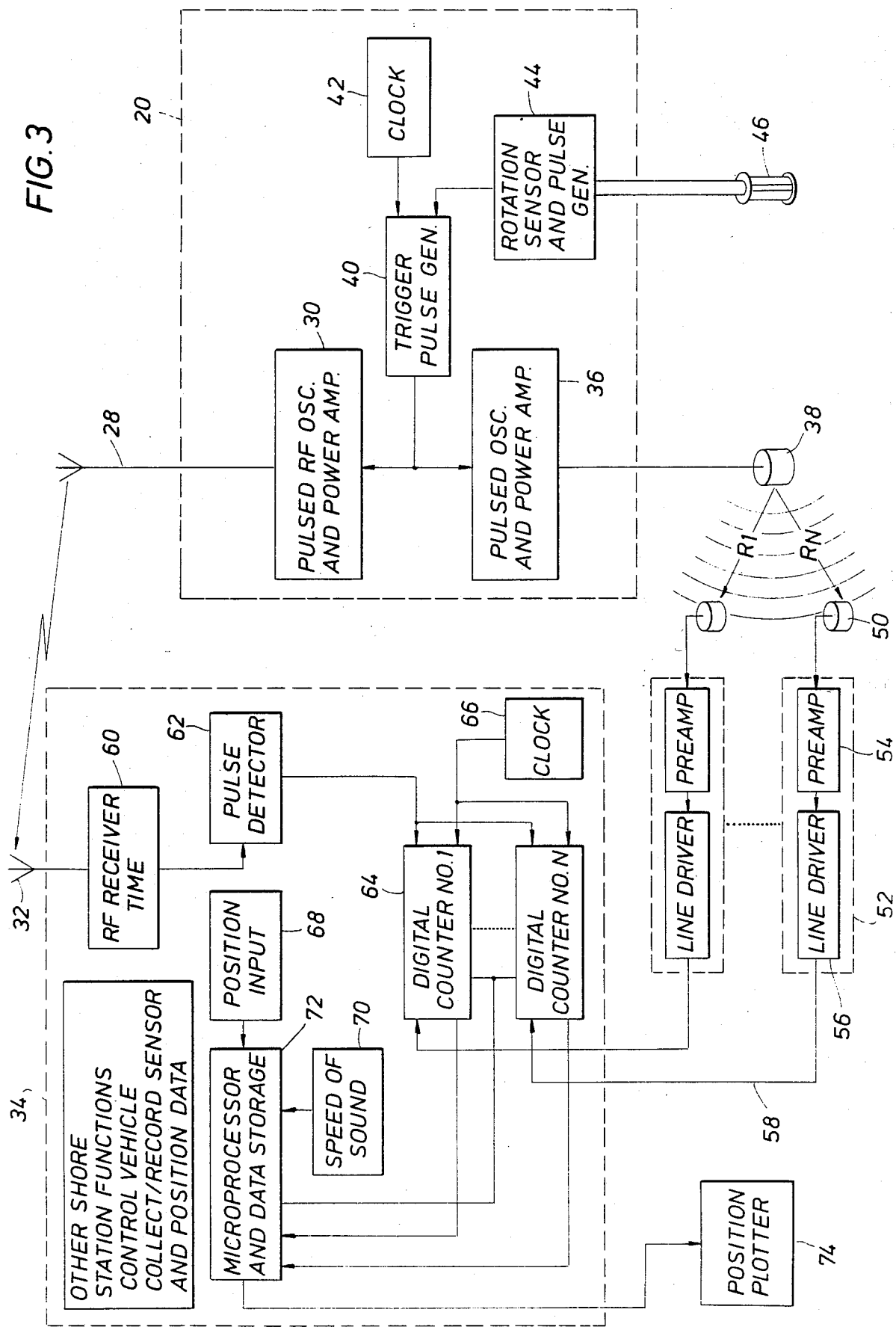
FIG. 3 is a schematic diagram of the apparatus of the present disclosure.

Attention is first directed to FIG. 1 of the drawings which shows an impoundment 10. The impoundment 10 is defined by a geomembrane 12 which is spread over a geographic area typically excavated by means of earth moving equipment to define the impoundment. The geomembrane normally covers a large expanse, perhaps several acres; even several hundred acres. The geomembrane is shaped to conform to the terrain around the impoundment 10. To this end, an earth embankment is built at 14 and fully encircles the impoundment 10. While the impoundment 10 may be any geometric size, shape or pattern, it is often made rectangular in shape. As will be discussed with regard to FIG. 2, an irregular shape is shown to bring focus on the enhanced capacities of the disclosed system. It is possible that a leak may arise at any place in the pond 10 at anytime. A leak is typified at 16 having the form of a tear or perforation in the geomembrane 12. The perforation or tear may allow the liquid to leak out of the impoundment at a slow or fast rate which rate depends in part on the nature of the liquid, the size of the tear or perforation, and the nature of the underlying soil. For instance, if the soil is sandy, the leaking liquid may be carried away rapidly. On the other hand, a base of clay may retard leakage. In any event, assuming that a leak has occurred, it is necessary to locate the leak. This procedure is undertaken by traversing the impounded liquid with the small boat or vessel 20. A radio controlled vessel subject to remote control will suffice. It typically carries leak detecting apparatus 18 which is exemplified in pending application Ser. No. 810,022 now abandoned and also pending patent application Ser. No. 824,440 now U.S. Pat. No. 4,719,407 assigned to the present assignee. The leak detecting apparatus 18 is placed in the vessel and is moved near the leak 16. When it detects the leak, it can form an appropriate signal indicative of the leak. The leak, however, cannot be located with any measure of precision unless the vessel 20 is at that time located also. The present apparatus is directed to a system for locating the vessel 20.

Keeping in view the background information given above, attention is next directed to FIG. 2 which should be considered jointly with FIG. 1. The precise outline of the impoundment 10 shown in FIG. 2 is subject to variation over a wide range. The irregular shape of the impoundment 10 amply illustrates the variety of sizes and shapes that the present system can cooperate with. Moreover, FIG. 2 shows an origin at 22 which defines an (x,y)-coordinate system. The entire pond of FIG. 2 is located in the first quadrant so that coordinate values are positive. It is not mandatory; it is beneficial so that the development of the theory of operation below can proceed with convenience. To this end, the origin 22 is defined by the intersection of the x-axis 24 and the y-axis 26.

As shown in FIG. 2, the vessel 20 is located on the pond 10. The vessel 20 supports a transmitter antenna at 28. The antenna 28 is also shown in FIG. 3. It is powered by a pulsed RF oscillator and power amplifier at 30. It transmits a short duration, momentary pulse. Typical values for operation of this transmitter include a frequency in the range of 470 megahertz where a pulse of short duration is transmitted. Pulse duration typically is in the range of a few microseconds, such as 20 microseconds. Transmitter radiated power need not be unusually strong, and about one watt will suffice. This pulse is transmitted to a receiver antenna at 32. The receiver antenna is also shown in FIG. 1. It connects to a receiver shore station 34 shown in detail in the block diagram schematic of FIG. 3. The receiver station 34 will be described in detail with a full description of FIG. 3. Moreover, the vessel 20 supports additional apparatus. It incorporates a pulsed oscillator and power amplifier 36 shown in FIG. 3 which in turn is connected to an underwater acoustic transducer 38. The transducer 38 transmits an acoustic pulse through the impounded liquid. The transducer 38 transmits along lines indicated by the symbol R shown in FIG. 1 and this will be discussed in detail hereinafter.

Operation of the transmitters 30 and 36 are synchronous. To this end, they are provided with a common trigger pulse from a trigger pulse generator 40. The pulse generator 40 is triggered by a periodic pulse from a clock 42. A highly precise clock is preferably used. For instance, it forms a pulse periodically, perhaps one per second. An alternative mode of providing a trigger is to utilize a rotation sensor and pulse generator 44. This is a system which is connected to a Savonius rotor 46. This rotor measures movement of the vessel in the water. As will be understood, the vessel supports other apparatus including a motor for rotating a propeller 48 shown in FIG. 1. A suitable steering system is including as well as sensors on the boat which detect the leak 16.

For an understanding of operation of the system, attention is momentarily directed to FIG. 3 of the drawings. There, the numeral 50 identifies a first underwater hydrophone. Representative installations of hydrophones are shown also in FIG. 1 of the drawings. Several hydrophones are installed around the impoundment 10 as shown in FIG. 2 of the drawings. FIG. 2 specifically shows five such hydrophones; it will be appreciated that only three are required to achieve a system for unambiguously locating the vessel 20 in the bounded impoundment. The number is preferably increased to provide a cross check so that the vessel location can be known with a high measure of certainty and precision. To this end, there are several hydrophones, and the operation and function of the several hydrophones will be described in detail.

In FIG. 3, each hydrophone provides output data to an acoustic receiver station 52. The receiver station 52 includes a preamplifier 54 and an amplifier which is known as a line driver 56. It forms a signal on the conductor 58 which is delivered to the shore station 34. This is repeated for all of the hydrophones 50 and, hence, multiple units of this equipment are included, each providing a signal to the shore station 34.

Returning now to FIG. 2 of the drawings, it is appropriate to describe operation of the system on viewing FIG. 2 first and thereafter describing the various components remaining in FIG. 3 in conjunction with operation of the system. Briefly, FIG. 2 utilizes the hydrophone acoustic sensor stations scattered around the impoundment 10. They are located at various locations in the first quadrant of the (x,y)-coordinate system having the origin at 22. Thus, each hydrophone 50 has a specific location which is identified by the coordinates $x_1$ and $y_1$ this being known for any number of hydrophones up to N, where N is a whole number integer. Individual hydrophones will be indicated hereinafter by the suffixes i or j which are whole number integers, and j is never the same as i. For further convenience, the vehicle position is indicated by the coordinates $x_o$ and $y_o$. As will be understood, the location of the vessel 20 is unknown while the locations of the several hydrophones 50 are specifically known. The precise location of the shore station 34 is not important and is not specified.

The numeral 60 identifies a typical path of travel of the vessel 20 in FIG. 2. When the vessel 20 is at a specific location (not then known to the operator), a radio frequency pulse is transmitted from the vessel 20. This pulse is transmitted from the radio frequency transmitter 30 by means of the antenna 28. A simultaneous pulse is transmitted from the acoustic transducer supported beneath the vessel 20. This pulse radiates through the impounded liquid.

The transmitted radio frequency pulse is detected at the receiver station antenna 32. This is treated as the initial time $t_o$. It is assumed that, for the purposes of the acoustical propagation measurements needed, the transmitted pulse received at the antenna 32 occurs simultaneously with the triggering and transmission. In view of the distance of the deployed antenna 28 from the shore antenna 32, a substantially instantaneous arrival is certainly justified. However, the acoustic transmitted pulse will travel through the impounded liquid at a lesser velocity. As an example, and assuming that the impoundment 10 holds fresh water, the velocity of sound in that water is approximately 1475 m/sec. It is not particularly important what the measure of velocity is; for the approach described below, that value will drop out. However, it is important that the liquid be more or less uniform in acoustic transmission velocity.

As shown in FIG. 1 of the drawings, the spacing between the acoustic transducer 38 and the hydrophone 50 is indicated by the symbol R. The acoustic transmission path $R_i$ is dependent upon velocity and transmission time. Thus, a first relationship can be derived, namely:

$$R_i = v(t_i - t_o) \quad (1)$$

In Equation (1), the symbol v represents the velocity of sound in the impounded liquid, this factor is assumed to be constant because the liquid is likely to be uniform and the value of the velocity is a factor which will ultimately drop out. The symbol $t_o$ represents the detection time of the RF transmitted pulse observed at the receiver antenna 32. The time $t_i$ is the time at which detection of the transmitted acoustic pulse traveling along the path $R_i$ shown in FIG. 2 occurs, this being observed at the hydrophone 50 indicated by the particular suffix.

In reality, each transmitted acoustic pulse forms a wavefront which is a circle which radiates outwardly from the location of the small boat 20 at $x_o$ and $y_o$. Since this wavefront began at time $t_o$, one thus can describe the radiation with the following relationship:

$$(x_o - x_i)^2 + (y_o - y_i)^2 = R_i^2 \quad (2)$$

Taking a ratio between various pairs of acoustic transmission paths, one then obtains Equation (3):

$$R_i^2 = \left[ \frac{t_j - t_o}{t_j - t_o} \right]^2 R_j^2; \quad (3)$$

where:

$$j \neq i; \; i = 1,2,3,4,5 \ldots$$

In Equation (3), it should be noted that j is different from i and thus they describe two separate acoustic transmission paths to two separate hydrophones.

From Equation (3), a factor given by $k_{ij}$ is thus given in Equation (4):

$$k_{ij} = \left[ \frac{t_i - t_o}{t_j - t_o} \right] \quad (4)$$

Substituting this factor into Equation (3), one then obtains Equation (5):

$$R^2 = k_{ij}^2 R_j^2; \; j \neq i; \; i = 1,2,3,4,5 \ldots \quad (5)$$

Utilizing Equation (2) and making the substitution obtained by Equation (5) into it, and with algebraic expansion of terms, one can then obtain the relationship in Equation (6):

$$\left[ x_o - \left( \frac{x_i - k_{ij}^2 x_j}{1 - k_{ij}^2} \right) \right]^2 + \left[ y_o - \left( \frac{y_i - k_{ij}^2 y_j}{1 - k_{ij}^2} \right) \right]^2 = \left( \frac{k_{ij}}{1 - k_{ij}^2} \right)^2 [(x_i - x_j)^2 + (y_i - y_j)^2]; \quad (6)$$

$$i \neq j; \; i,j = 1,2,3,4,5, \ldots$$

Examination of Equation (6) shows that it is the equation of a circle having a center specified by x and y coordinates which are given in Equation (7):

$$\left( \frac{x_i - k_{ij}^2 x_j}{1 - k_{ij}^2}, \frac{y_i - k_{ij}^2 y_j}{1 - k_{ij}^2} \right) \quad (7)$$

Moreover, the right hand term of Equation (6) describes the radius of the circle. Certain practical constraints on this circle must be observed to avoid trivial solutions for the boat coordinate $x_o$ and $y_o$. For instance, the term $k_{ij}$ must be greater than zero. Moreover, the values of $x_o$ and $y_o$ should be within the limits established in FIG. 2. That is, the two axes shown in FIG. 2 have minimum and maximum values established by the boundaries of the impoundment. Obviously, this follows the fact that the boat 20 cannot be located outside of the impoundment and thus the practical solutions are within the constraints specified.

As shown in FIG. 2, multiple hydrophones are used. This describes several possible combinations thereby yielding multiple pairs of simultaneous equations to be solved on writing Equation (6) for the various pairs where i and j are specified for up to several pairs of hydrophones. As will be understood, the number N can be any whole number integer. As N increases, the number of equations to be written from Equation (6) increases. They are solved simultaneously to provide an unambiguous location for the boat 20 to yield the boat coordinates $x_o$ and $y_o$. This can be done for each plse transmission. As will be observed, the precise measure of velocity of the transmitted acoustic pulse along the line $R_i$ shown in FIG. 2 drops out and it is not necessary to know the velocity of sound in the liquid.

In summarizing the boat position analysis process described to this point, it may be first treated as a set of circles arranged about the relative locations of the hydrophones 50 shown in FIG. 2. For example, the distance $R_2$ for the particular hydrophone is determined and, with knowledge of the sound propagation velocity, one could then draw a circle around the hydrophone with a radius of $R_2$. This specifies the range from the hydrophone 50 to the vessel 20. In theory, this range is described by a circle, but obviously, the portion of the circle outside the impoundment 10 is meaningless. This circle determines that the small boat 20 is located at some point on the arc of the circle that is over the impoundment 10. Separately, a range $R_3$ would be determined for another of the hydrophones and that will also describe an arc of a circle. Each operative hydrophone yields a particular arc of a circle around that hydrophone. If they were all graphically drawn on a representation of the impoundment 10 which is accurate in scale, this would graphically locate the vessel. Through the use of multiple hydrophones, where N exceeds 2, there would be sufficient data to obtain unambiguous evaluations of the location of the boat 20. Graphically, one could then inspect and reject those circular arcs which do not pass through a common juncture. So to speak, this would be a method of fitting the data to be sure that the boat position is highly accurate.

Equation (6) expresses the position coordinates $x_o$ and $y_o$ of the boat in terms of the known parameters of the hydrophone coordinates $x_i$ and $y_i$ and the measured elapsed times $(t_i - t_o)$ of the acoustic pulses detected by the hydrophones. The valve of the sound propagation velocity is not required to be known since this parameter does not appear in Equation (6). An equation of the form of Equation (6) can be written for every pair of different hydrophone stations which detect the acoustic pulse. Thus, two such hydrophone stations will produce one equation, three such hydrophone stations will produce three equations, four such hydrophone stations will produce six equations, and so on. With three equations of the form of Equation (6), the boat position coordinates $x_o$ and $y_o$ can be calculated without ambiguity of the results. With more equations of the form of Equation (6), every combination of three different equations can be used to calculate the boat position coordinates $x_o$ and $y_o$ and the derived values of $x_o$ and $y_o$ can then be averaged to produce the most accurate position information.

There is an alternate approach for determining the location of the vessel 20. Going back to Equation (2) above which describes a circle around the vessel 20 where the vessel 20 is at the location $x_o$ and $y_o$, one can write the following pair of Equations (8) and (9). Here, the equations are written where i is not equal to j.

$$(x_o - x_i)^2 + (y_o - y_i)^2 = v^2(t_i - t_o)^2 \quad (8)$$

$$(x_o - x_j)^2 + (y_o - y_j)^2 = v^2(t_j - t_o)^2 \quad (9)$$

Observe on FIG. 2 that there are minimum and maximum values of x and y on the coordinates 24 and 26. The precise location of the boat 20 is bounded by the coordinate limits given in Equations (10) and (11). Equations (10) and (11) identify the hydrophone subscripts as j=5,1 and i=3,2 in Equation (10) and (11), respectively.

$$[x_{max} - v(t_5 - t_o)] < x_o < [v(t_1 - t_o)] \quad (10)$$

$$[x_{max} - v(t_3 - t_o)] < y_o < [v(t_2 - t_o)] \quad (11)$$

This is in accordance with the actual arrangement of the hydrophones in FIG. 2. As will be understood, the particular subscripts indicating particular hydrophones might vary with an alternate arrangement of hydrophones around the impoundment 10. The key emphasis here is to utilize the hydrophone locations which yield minimum and maximum values along the respective axes 24 and 26. Obtaining common solutions for $x_o$ and $y_o$ from pairs of Equations (8) and (9) for different pairs of hydrophones may be computed to determine an error function defined by Equation (12) given below:

$$(x_o - x_i)^2 - (x_o - x_j)^2 + (y_o - y_i)^2 - (y_o - y_j)^2$$
$$- v^2[(t_i - t_o)^2 - (t_j - t_o)^2] = e_{ij} \quad (12)$$

In Equation (12), the velocity term is included. This is known to be 1475 m/sec in fresh water. Precise measure can be readily determined for the liquid actually in the impoundment 10. Substituting the measure of velocity in Equations (8) and (9) removes that variable. The range of the values of $x_o$ and $y_o$ is known by the limits set forth in Equations (10) and (11). These are numerically known by the definition of the coordinate system shown in FIG. 2. Incremental advancement of specific values of $x_o$ and $y_o$ beginning with selected minimum or maximum values can then be incorporated into Equations (8) and (9), ultimately leading to a calculated error function $e_{ij}$ for incrementally changed values of $x_o$ and $y_o$. As $x_o$ and $y_o$ approach the actual location of the vessel 20, the error function is reduced, or in other words, $e_{ij}$ is reduced to some minimum value. This is done for the hydrophones $50_i$ and $50_j$. It can also be done for another pair. This will determine a second location for the vessel 20. The several locations lead to several error functions $e_{ij}$. The several error functions will close toward zero yielding a precise measurement of the location of the vessel 20 by repeating the iterations. Thus, the location of the vessel can be calculated from multiple pairs of hydrophones 50. The several calculated locations can be used either by averaging or by inspection to discard the values most in error to yield an accurate measure of the location of the boat 20. Such iterations can be routinely carried out in a microprocessor.

Going now to FIG. 3, the apparatus which carries out the determination of the vessel location 20 will be discussed in greater detail. Recall that the boat 20 carries the equipment shown in FIG. 3 which transmits the RF pulse from the antenna 28 and the acoustic pulse from the transducer 38. The several hydrophones 50 form output signals which are delivered to the shore station 34. They are conveniently wired directly to the shore station 34. Alternatively, wireless transmitter links can be used instead of the wireline links. In any case, the shore station 34 incorporates an RF receiver for the transmitted RF pulse. The receiver is identified by the numeral 60. It forms an output to a pulse envelope detector 62 to detect the transmitted pulse on the RF carrier. The detected pulse is used as a reset pulse for a digital counter 64. The digital counter counts elapsed time and is switched off by a stop pulse detected by one of the hydrophones 50. Since there are N hydrophones 50, there must be N digital counters, one assigned to each. They all start at the same instant. They store pulses from a clock 66 which preferably runs at one megahertz. This divides the time into microseconds. All the counters are switched on at the same instant because they are provided with a common reset signal. Each is stopped at an individual increment or count depending on receipt of the acoustic signal at the respective hydrophones 50.

The station 34 includes position input for the hydrophones. Another input is incorporated which defines the speed of sound for the impounded liquid and this is identified at 70. These values are entered into the microprocessor 72. The microprocessor 72 in conjunction with the calculated or elapsed time stored in the counters 64 then determines the location of the vessel 20. This position information is displayed by the position plotter 74 to identify the location of the vessel 20. As will be understood, this position plot is updated periodically, and can be conveniently recalculated sufficiently often that the precise location and track of vessel 20 is known.

Failure of any of the individual hydrophones or loss of data from a hydrophone is not fatal to the position finding operation. Rather, multiple hydrophones are used so that some are redundant so long as at least three hydrophones are operative. Momentary loss of data also is not a difficult problem to overcome because the vessel typically travels sufficiently slow that the movement of the vessel between data points is quite small. The vessel normally is operated at relatively slow velocities on the surface, thus permitting sufficient time to enable the leak detector means 18 to obtain data in identifying the location of leaks in the geomembrane.

While the foregoing is directed to the preferred embodiment, the scope is determined by the claims which follow.

What is claimed is:

1. For use with a vessel traveling across liquid in an impoundment confined within a geomembrane wherein the vessel carries leak detecting apparatus to locate leaks in the geomembrane, a position determining system which comprises:
   (a) at least three hydrophones located around the periphery of the liquid impoundement adapted to receive sound transmissions through the liquid impoundment;
   (b) acoustic transmitter means on the vessel for emitting periodic acoustic pulses into the impounded liquid for reception by said hydrophones;
   (c) timing means for providing a measure of elapsed travel time from the acoustic transmitter on the vessel to the respective hydrophones, said timing means providing the elapsed time as a function of travel through the impounded liquid; and
   (d) calculating means for determining as a function of the elapsed travel time determined by said timing means, said calculating means determining the range from said hydrophones to said acoustic transmitter and further determining the location of the vessel on the impoundment as a function of range, said calculating means being independent of the value of the velocity of sound in said liquid.

2. The apparatus of claim 1 including an RF transmitter on the vessel for transmitting a synchronous timing pulse with transmission of an acoustic pulse from said acoustic transmitter, such that said timing signal is associated with the beginning of transmission of said acoustic signal, and further including receiver means for receiving the transmitted RF pulse, said receiver means resetting said timing means to zero to determine elapsed time of travel of the acoustic pulse from said vessel to said hydrophones.

3. The apparatus of claim 2 including clock means on said vessel for periodically causing said RF transmitter and said acoustic transmitter to form and transmit pulses simultaneously.

4. The apparatus of claim 3 including an RF transmitter antenna on said vessel for communicating with an RF receiver antenna located at a shore station wherein said shore station incorporates said timing means and said means for calculating.

5. The apparatus of claim 1 wherein N (a whole number integer) hydrophones are located about said impoundment and are connected to N timing means to provide acoustic travel time for each of N hydrophones, wherein said timing means is activated by an electromagnetic wave signal transmitted from said vessel.

6. The apparatus of claim 5 including separate driver amplifiers connected at each of said N hydrophones for amplifying the output signals thereof, and further including means linking said amplifiers to a shore station, said shore station incorporating said timing means and means for calculating.

7. The apparatus of claim 1 including means for controlling transmission of acoustic pulses from said vessel dependent on movement of the vessel through said liquid.

8. A method for determining the location of a leak in a geomembrane defining a liquid impoundment, the method comprising the steps of:
   (a) measuring the transmission time of an acoustic pulse from a vessel traversing the liquid impoundment with a supporting leak detecting means to thereby obtain indications of leaks in the geomembrane;
   (b) determining the position of the vessel as it traverses the liquid impoundment as a function of time independent of the velocity of said acoustic pulse through said liquid; and
   (c) coordinating the determination of a leak in the geomembrane with the plotted location of the vessel to thereby determine the location of the leak.

9. The method of claim 8 including the step of transmitting a synchronizing pulse from the vessel by ratio transmission, and further transmitting through the liquid an acoustic pulse to radiate outwardly from the vessel wherein said synchronizing pulse is associated with the beginning of transmission of said acoustic signal;
   thereafter detecting the liquid transmitted acoustic pulse;
   measuring acoustic pulse transmission time in reference to said radio transmitted synchronizing pulse; and
   as a function of measured time, determining the location of the vessel.

10. The method of claim 8 further including the step of determining range in the impounded liquid said range being related to the travel time for the acoustic pulse to be received by an acoustic pulse listening hydrophone, said range being described by a circular path around said hydrophone.

11. The method of claim 10 further including the step of determining the range to at least three separated hydrophones, and then determining the vessel location as a function of the separate range determinations.

12. The method of claim 11 including the step of determining location by defining an arc of a circle around said hydrophones having a radius determined by range, and further testing the arcs for intersection to locate the vessel.

13. The method of claim 12 wherein N hydrophones determine N ranges and define N arcs, N being a whole number integer, and testing arc intersections to locate the vessel.

* * * * *